Figure 4:
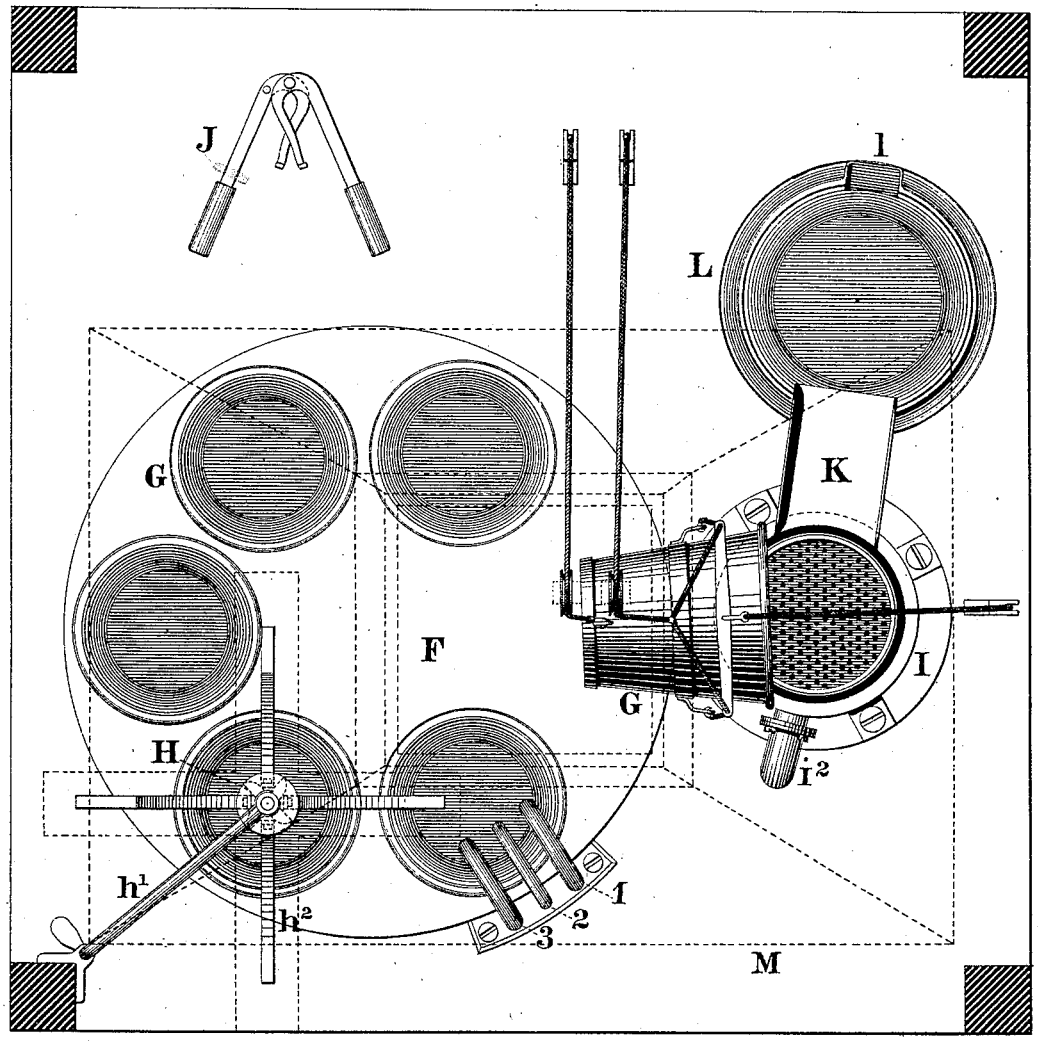

3 Sheets—Sheet 1.
J. W. HYATT.
Apparatus and Process for the Manufacture of Nitro-Cellulose.
No. 210,611. Patented Dec. 10, 1878.
FIG. 1. FIG. 3.
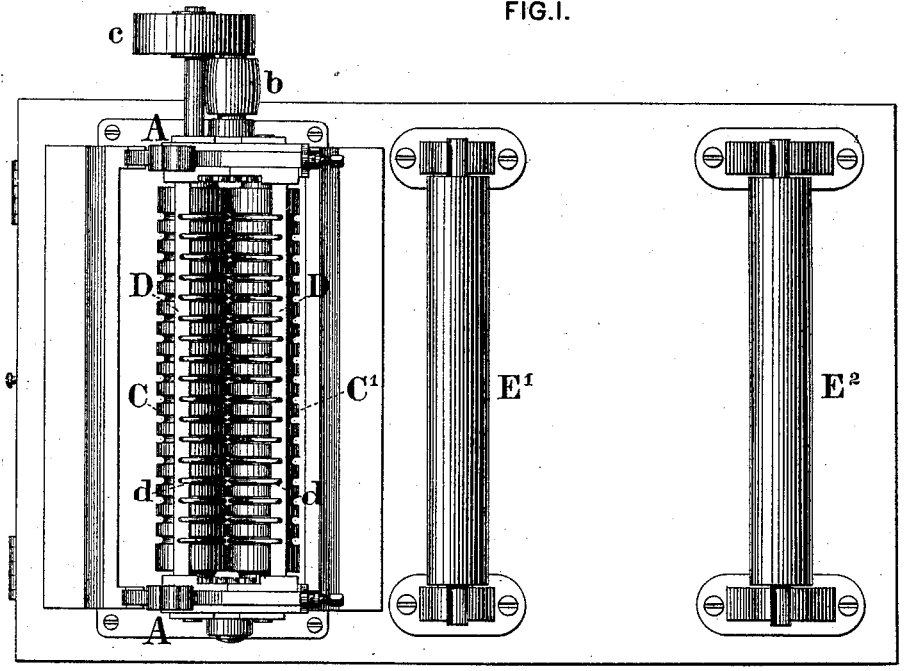
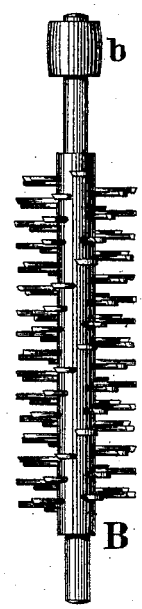
FIG. 2.
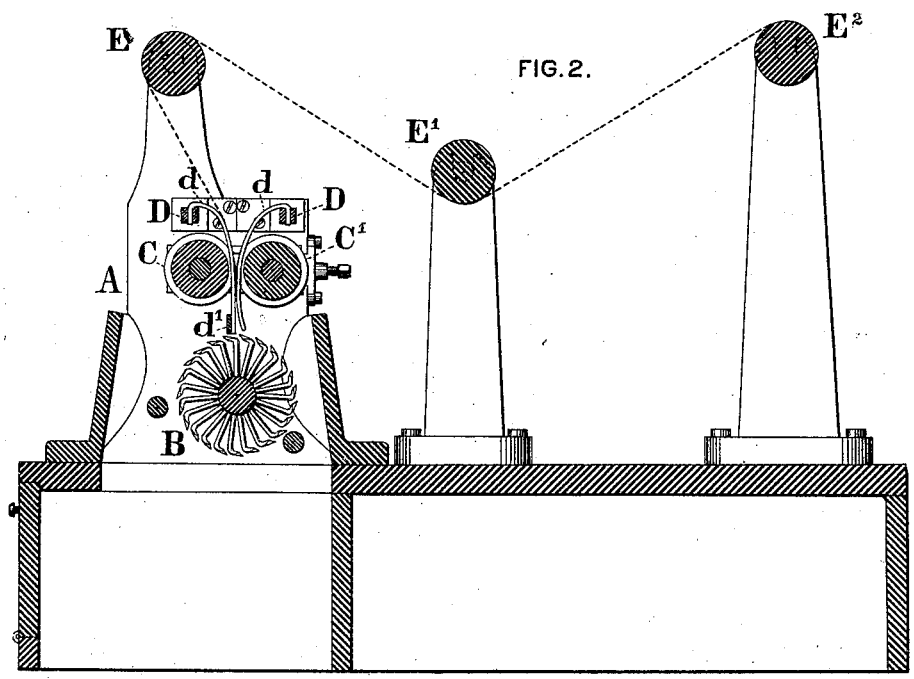
WITNESSES. INVENTOR.
J. Snowden Bell. John. W. Hyatt.
J. Walter Douglass. by Henry Baldwin Jr
Atty.

J. W. HYATT.
Apparatus and Process for the Manufacture of
Nitro-Cellulose

No. 210,611. Patented Dec. 10, 1878.

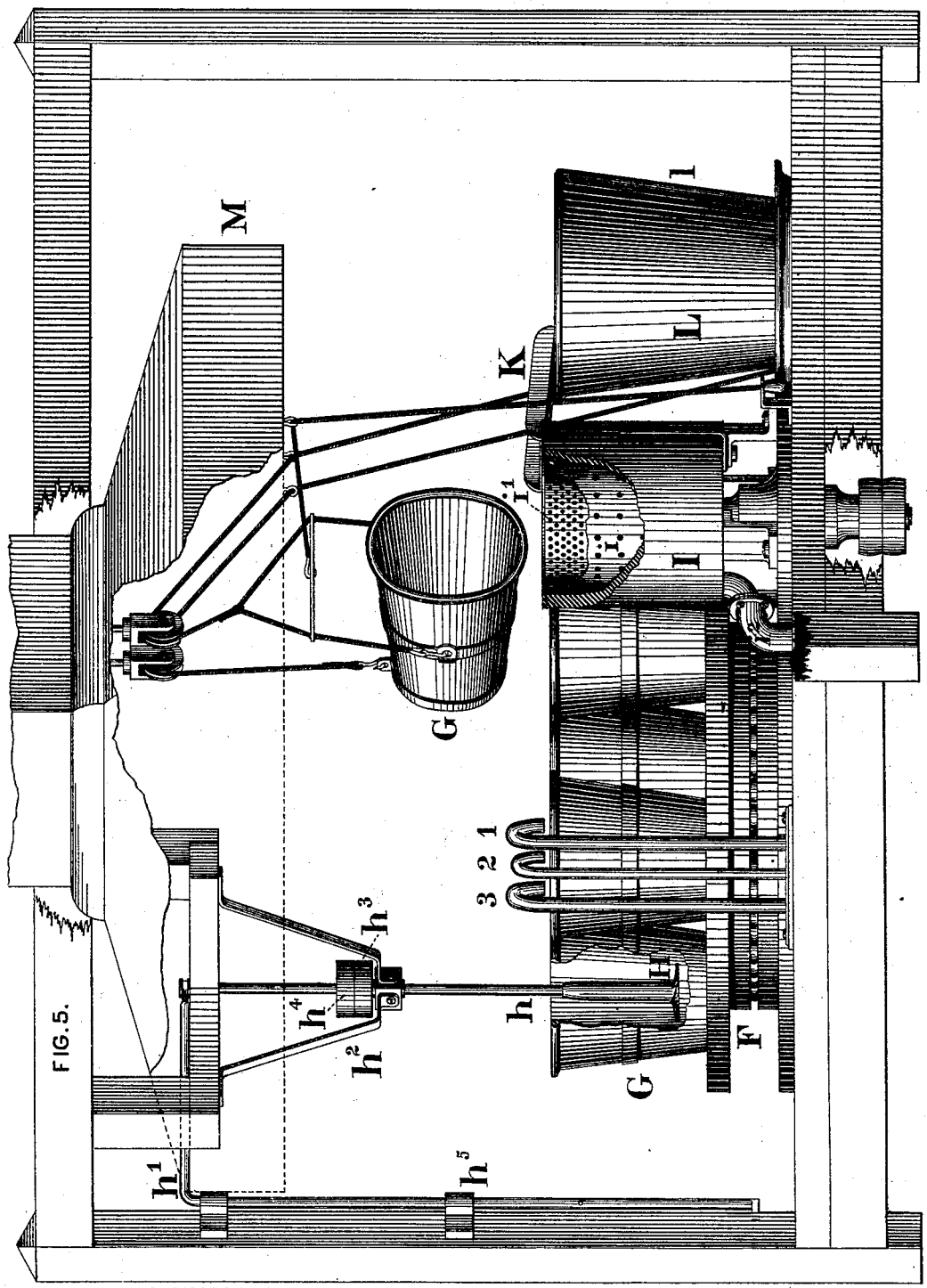

UNITED STATES PATENT OFFICE.

JOHN W. HYATT, OF NEWARK, NEW JERSEY, ASSIGNOR TO THE CELLULOID MANUFACTURING COMPANY, OF NEW YORK, N. Y.

IMPROVEMENT IN APPARATUS AND PROCESSES FOR THE MANUFACTURE OF NITRO-CELLULOSE.

Specification forming part of Letters Patent No. 210,611, dated December 10, 1878; application filed July 12, 1878.

*To all whom it may concern:*

Be it known that I, JOHN W. HYATT, of Newark, in the county of Essex and State of New Jersey, have invented certain new and useful Improvements in Apparatus and Processes for the Manufacture of Nitro-Cellulose or Soluble Fiber, especially prepared for and adapted to use in the manufacture of plastic compounds, of which the following is a specification:

My invention consists in an improved process of converting vegetable fiber into nitro-cellulose; and for the conduct of this process I have devised certain arrangements and combinations of apparatus, so that the different steps may be taken in due order of procession with greater facility, greater efficiency, greater economy, and greater rapidity than heretofore, at the same time relieving the operators from much of the discomfort and detrimental effect heretofore incident to the work, and even permitting other operations to be carried on in the same apartment without subjecting the workmen to the distress of a vitiated atmosphere.

The apparatus which I have thus arranged and combined is shown in the accompanying drawings, which form part of this specification.

Nitro-cellulose is, as is well known, the product resulting from the treatment of vegetable fiber with nitric or nitric and sulphuric acids. Variations in the acids, or in the strength and proportions of the compounds and in the form of the fiber, produce modifications of nitro-cellulose, which are designated by different characteristic names—as, for example, "gun-cotton," "xyloidine," (though this more strictly refers to converted starch,) "pyroxyline," and "soluble fiber."

It being my object to prepare nitro-cellulose or soluble fiber, to be afterward compounded with other ingredients constituting the plastic material now known as "celluloid," I shall describe my improved process as applied in the best form known to me, and for the production of soluble fiber to be ground into pulp, though, as will be seen from the following specification, the treatment may be stopped short of this subsequent process if the purpose for which the soluble fiber is to be used should not require it to be ground. As to the acids employed, they may be in different proportions or of different strengths, adapted to the ultimate purpose of the soluble fiber and the desired degree of solubility, as is well understood, and the selection or the proportion of the acids will be accordingly determined by the operator, and forms no part of the improvements herein claimed.

The first step of my process has for its object the preparation of vegetable fiber for rapid and perfect conversion into nitro-cellulose or soluble fiber; and to this end my improvement consists in taking paper (unsized and uncalendered tissue-paper is best) which has been made in sheets, and, preferably, paper made from stock which has been bleached by any of the ordinary processes, and reducing this paper to small flakes; and this I do in practice by taking a roll of such paper, mounting it in a frame, and feeding it between rollers and under tension to a cylinder armed with hook-teeth, set close together, which tear the sheet of paper into exceedingly minute shreds or particles, (which I designate "flakes,") presenting almost as much edge as surface, so that when immersed in the acids they are acted upon almost instantaneously throughout, and converted more uniformly than would otherwise be practicable. This first step of my improved process I designate "disintegration," to express the reduction of the tissue-paper into minute flakes.

To expedite the converting action still further, the second stage of my improved process consists in preparing the acid-bath in a vessel of stoneware or other suitable material, which I place under a shaft carrying on its lower end a stirrer, and rapidly rotating the shaft, so that the stirrer will give the bath a swift swirling motion; and by setting the blades of the stirrer at an angle somewhat similarly to the blades of a propeller, I increase the centrifugal motion of the acids, crowding them up at the side of the vessel and leaving a depression at the center, so that the flakes of paper being now fed into the bath are first swept into the vortex of the swirl by centripetal force, and there subjected to the intensified action of the bath, and as the increasing mass of flakes is saturated and immersed it is gradually swept from the center to the side of the vessel, where its motion is slower, leaving the center free for the reception of the fresh flakes, which are constantly fed into the vortex, where they are acted upon on all sides instantaneously; and in this way I effect the treatment of a much larger quantity of the paper than the bath would otherwise act upon effectively. This second step of my improved process I designate "conversion," to express the transition of the disintegrated flakes from their normal condition into that of saturated soluble fiber.

The quantity of flakes which can be properly fed into the bath, and properly acted upon, as described, having been thoroughly converted, the workman raises the stirrer out of the vessel, which has been resting upon a turn-table, and brings under the stirrer another vessel, which meanwhile has been duly supplied with acids pumped up through pipes, arranged in proper relative position to have the vessel brought under them by the rotation of the turn-table. He then lowers the stirrer into this freshly-charged vessel, sets it in motion, and feeds in fresh flakes as before, and, when they are converted, again raising the stirrer, passes the vessel onward by the turn-table.

The next stage of the process is the separation and recovery of the surplus acid from the saturated soluble fiber, and this is effected as follows: I establish close to the turn-table, and near to the acid-supply pipes, a centrifugal machine or "whizzer," provided with a second perforated rotating removable basket, fitting loosely within the ordinary perforated basket, which latter is mounted upon a vertical shaft, carrying a driving-pulley upon its lower end. The acids pass through the perforations in the baskets into the space between the outer basket and the casing, and off through a pipe leading from the bottom of this casing to the reservoir below, from which they may be again pumped up through the supply-pipes.

The turn-table having brought the vessel containing the acid and converted fiber opposite the "whizzer," (as, for brevity, I shall designate the centrifugal machine throughout,) the vessel is lifted and its contents emptied into the whizzer, which, rotating rapidly, throws out the surplus acid, as is well understood. This third stage of my improved process I designate "desiccation," to indicate the removal of the surplus acid, without intending to suggest that the nitro-cellulose is entirely freed from acid.

The next stage of my improved process is to wash out the acids left in the desiccated fiber after the operation of the whizzer; and to this end I arrange behind the whizzer a washing-vat, supplied with water, and having an overflow near the top, and an inclined table extending from the whizzer to the edge of this vat, so that by lifting the removable basket out of the whizzer with suitable lifting-hooks the desiccated fiber is dumped on the table and slides down into the washing-vat, where it is stirred and thoroughly washed in the constantly-changing water until the acids are thoroughly removed. This fourth stage of my improved process I designate "ablution," to express the transition of the nitro-cellulose from the condition of desiccation to the condition of hydrated soluble fiber. From this vat the hydrated soluble fiber may be transferred to another whizzer, which will remove the surplus water, or to a beating-engine, and ground into pulp.

It will thus be seen that by my improved process the fiber is disintegrated, the converting-vessel is charged with acid and conveyed to the stirrer, the disintegrated fiber fed into the swirling acid-bath and saturated, the saturated converted fiber conveyed to and transferred into the whizzer, the surplus acid removed and recovered, and the desiccated nitro-cellulose transferred to the washing-vat and the washing effected without any intervals or loss of time between these different operations, so that the acids are being washed out of the desiccated soluble fiber as constantly as the raw flakes are being fed into the acid-bath, and the intermediate stages of the process are constantly progressing.

In addition to the continuity of this process, I have devised certain improvements in the apparatus, which I also claim as new, to wit: the combination and arrangement, with the turn-table carrying the vessels, of the supply-pipes, the stirrer, the whizzer, and the washing-vat; and, further, a new and improved stirrer, which will be hereinafter more particularly described.

I also provide a hood or canopy, extending over the entire apparatus, and having an induced upward draft through it, whereby the fumes from the acids are not only prevented from becoming diffused throughout the entire apartment, but are so rapidly carried off through the hood as to greatly relieve the workmen immediately about the apparatus from the distress incident to the use of such acids in open vessels.

I also provide the converting-vessels with lugs above and below the center of gravity, and rig-lifting apparatus at the proper points for elevating and tilting the converting-vessels to empty them into the whizzer; and by the use of these devices and of a suitable lifting-hook for raising the removable basket from the whizzer, the process is conducted with very little occasion to touch the vessels with the hands.

In the accompanying drawings, which form part of this specification, Figure 1 is a plan or top view of the disintegrating apparatus; Fig. 2, a vertical longitudinal section through the same; Fig. 3, a view, in elevation, of the disintegrator detached; Fig. 4, a plan view, showing the general arrangement of the converting apparatus; and Fig. 5, a side view, in elevation, of the same.

The disintegrating apparatus consists of a frame supporting a pair of housings, A, with bearings below for the shaft of the disintegrator B, and bearings in adjustable boxes above for the grooved feed-rollers C C', a driving-pulley, $c$, being mounted on the projecting end of the shaft of the feed-roller C, which roller rotates the feed-roller C' by frictional contact. The housings also support a transverse frame, D, in which guide-teeth $d$, of wire, are so arranged that each of them shall take into one of the grooves of the feed-rollers.

The guide-teeth, which fit in the grooves of the roller C, extend down below the feed-rollers, and are secured to and support the guide-bar $d'$, parallel with the roller and immediately above the teeth of the disintegrator, in line with the line of contact of the feed-rolls.

The teeth which fit in the grooves of the roller C' are slightly curved at their lower ends, so as to turn away from the bar $d'$, and the lower points of these teeth are about in line with the lower edge of the guide-bar.

As the feed-rollers are rotated the paper is carried down between them and between the teeth, in such wise that while the teeth in the roller C' permit the paper after it passes below them to turn toward the knives, the guide-bar $d'$ sustains it against the action of the knives and holds it smooth throughout its entire width, so that it is uniformly fed under the tension of the rollers and presented to and acted upon by the teeth of the disintegrator and reduced to substantially uniform flakes, instead of being irregularly torn and wadded.

The disintegrator B consists of a number of hook-teeth or knives arranged close together in spiral lines around and upon its shaft. The elements which will determine the size of the flakes are a given number of teeth and a given rate of speed in the disintegrator, and a relatively slower rate of speed in the feed-rollers; but I do not find it desirable to reduce the paper to flakes of less size than, say, one-sixteenth of an inch.

The revolution of the disintegrator is in a direction opposite to that of the driven feed-roller, and is imparted by a pulley, $b$, on the projecting end of the disintegrator-shaft.

The paper is supplied to the disintegrator from a roller, $E^2$, and passes under a roller, $E^1$, and over a roller, E, down to and between the feed-rollers C C'. (See the dotted line in Fig. 2.) This operation, being an ordinary one and well understood, need not be more particularly described.

The flakes fall into a receptacle below the disintegrator, from which they are removed as required.

The converting apparatus is arranged as shown in Figs. 4 and 5, and comprises, first, a turn-table, F, mounted on spherical balls or other suitable suspension, and having such diameter as will accommodate a series of the converting-vessels, G. At a proper point supply-pipes 1 2 3, leading from the acid-reservoirs below, have their spouts curved over, so that one of the vessels G, standing upon the turn-table, may, by the rotation of the table, be brought under the spouts and charged with acids by the action of a pump. The further rotation of the turn-table then moves the charged vessel from the spouts around underneath the stirrer H, which is supported above the turn-table, so that the charged vessel on the turn-table will stand under it centrally. This stirrer is composed of a series of short blades, set or bent at a slight inclination to their shaft, so that they will induce a swirling motion in the acid-bath, and attached to the lower end of a vertical shaft, $h$, which can be raised high enough above the turn-table for the vessel to be placed under or removed from beneath it, and lowered so as to rotate in the vessel near the bottom. This raising and lowering of the stirrer is effected through a bent rod, $h^1$, connected with the upper end of the shaft $h$. The shaft $h$ of the stirrer passes through a depending bracket, $h^2$, and is provided with a loose pulley and a fast pulley, $h^3$ $h^4$, through which, when the stirrer is lowered so that the pulleys are brought together, the stirrer is rotated by a belt, the motion being stopped, however, when the shaft is raised and the fast pulley $h^4$ removed from the action of the belt. A pin passing through the rod $h^1$ and resting upon a bracket, $h^5$, sustains the stirrer when raised. It will of course be understood that the blades of the stirrer and so much of its shaft as is liable to be reached by the acids should be made of or covered with copper or other metal or composition which will resist the corrosive action of the acids, and the same precaution should be observed in protecting all the surfaces of the apparatus liable to be attacked and impaired by the acids. Stoneware will be found very suitable for the converting-vessels.

The stirrer being lowered into the charged vessel G and set in motion, and the acids having been brought to the proper swirl, the flakes of the disintegrated paper are fed into the vessel at or near the center or vortex of the swirl and subjected to the action of the bath, this stirring operation being continued until, by the action of the acids, the flakes have been thoroughly converted into nitro-cellulose. The flakes fed into the center or vortex are, by the operation of the stirrer-blades, thrown outward toward the side of the vessel, and their place is supplied by fresh flakes fed in at the center until the thickness of the mass indicates the limit of the saturating capacity of the bath, when the shaft of the stirrer is raised and the turn-table rotated, carrying the vessel from underneath the stirrer round opposite a whizzer or centrifugal machine, consisting of the case I, firmly secured in position, the perforated rotating basket $i$, mounted upon the upper end of the vertical shaft, by which it is rotated through a pulley on the lower end of the shaft, (see Fig. 5,) and the removable perforated rotating basket $i^1$, fitting loosely within the basket $i$.

To transfer the converted flakes from the vessel G, I rig a tackle between the turn-table and the whizzer, with three hooks, two on one rope, to take into the lugs or eyes on the sides of the vessel, and thereby lift the vessel, and one on the other rope, which takes into the lug or eye near the bottom of the vessel to tilt it when raised; and on the opposite side of the whizzer a line is provided, running through an eye to the lifting-tackle, so as to draw the raised vessel into proper position to be tilted and emptied into the removable basket of the whizzer. (See Figs. 4 and 5.) The whizzer meanwhile having been duly set in motion, the surplus acid is rapidly expelled from the converted flakes, and passes down between the outer basket, $i$, and the case of the whizzer to a pipe, $i^2$, which conducts it to the cistern or reservoir, from which it may be again pumped up through the supply-pipes 1 2 3. When the action of the whizzer is completed and the converted flakes freed from the surplus acid, the removable basket $i^1$ is lifted out by means of a pair of internal lifting-hooks, J, Fig. 4, and its contents dumped upon the inclined table K and into the washing-vat L, which is supplied with water, and the converted flakes are stirred and washed therein, under a constant circulation of water, supplied in any suitable manner and passing off through the overflow $l$ near the top of the vat. From this vat the washed mass is removed, for further treatment not pertaining to this process, which is concluded with this condition of the hydrated soluble fiber.

It will be observed that the diameter of the turn-table is such as to allow space thereon for a series of the converting-vessels G, the relative position of which is such that while one is in readiness to be lifted and its contents dumped into the vessel, another is being charged with acid, and a third is beneath the stirrer, while between the one under the stirrer and the one at the whizzer there is room for several others, so that there may be always a series of vessels that have passed the stirrer, ready for being dumped into the whizzer and passed again under the supply-pipes, and the operation may be thus carried on without any intervals between the stages. The entire apparatus is also accommodated in a much smaller space than has heretofore been required.

To relieve the workmen from distress that would be occasioned by the fumes of the acid and to economize room, I suspend a canopy, M, over the turn-table, the whizzer, and the washing-vat, and through the top of this canopy I induce an upward draft into the open air through a chimney or otherwise, so that the fumes, instead of being diffused throughout the apartment, as usual, rendering the atmosphere unfit for any other work in the same apartment, are confined to that part of the room in which the converting process is carried on, and are rapidly conducted away from even that part. The lifting-tackle above described may work over pulleys suspended from the frame of this canopy, as shown, and so also the shaft of the stirrer can extend up through it to give it the necessary range of lift.

Having thus described the nature and objects of my invention, what I claim as new, and desire to secure by Letters Patent, is—

1. The hereinbefore-described process of manufacturing soluble fiber from paper by disintegration, conversion, desiccation, and ablution, substantially as set forth.

2. The combination and arrangement of a turn-table, a stirrer, a centrifugal machine, and a washing-vat, substantially as and for the purposes set forth.

3. The combination, with a converting-vessel, of a stirrer having inclined blades, to induce a centrifugal swirl in the acids and the saturated flakes and a centripetal swirl in the fresh flakes, substantially as set forth.

4. The combination, with a converting-vessel and a stirrer, of a device for lifting and lowering the stirrer, substantially as and for the purposes set forth.

5. The combination, with the disintegrator, of the feeding-rollers and the guide-teeth, substantially as and for the purposes set forth.

6. The combination, with the disintegrator, the feed-rollers, and the guide-teeth, of the guide-bar $d'$, substantially as and for the purpose described.

JOHN W. HYATT.

Witnesses:
W. S. PLUME,
WM. PLUME.